Figure 1:
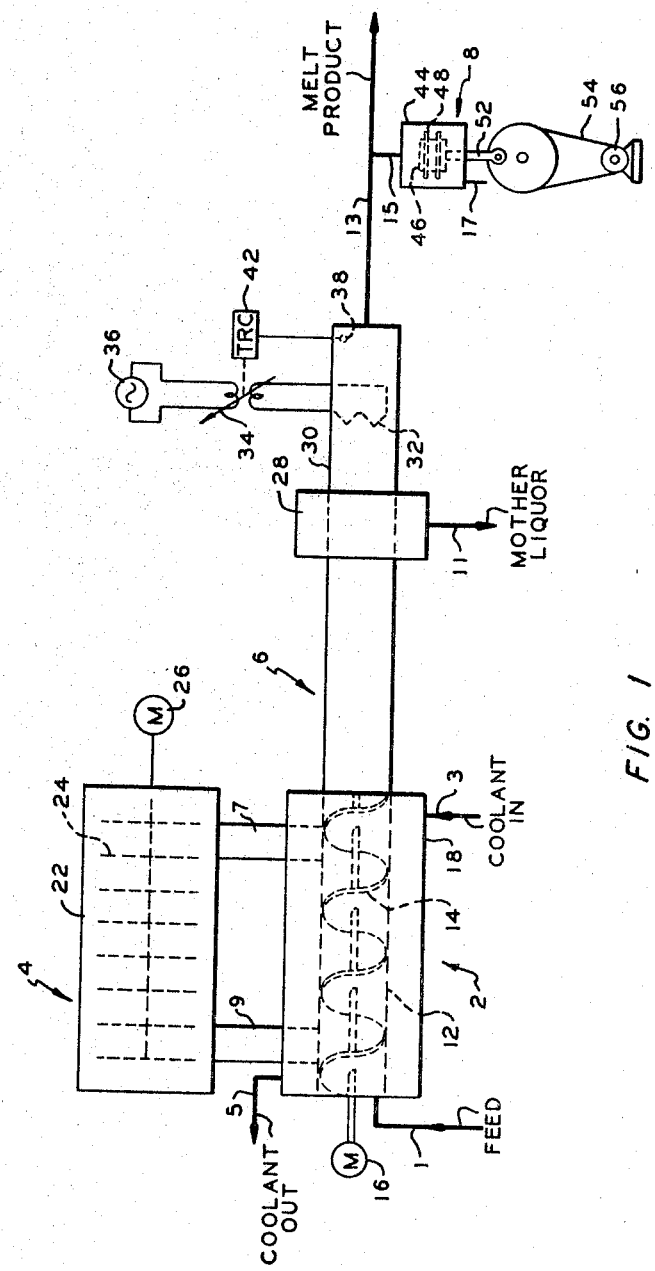

Sept. 5, 1967

J. E. COTTLE 3,339,372

FRACTIONAL CRYSTALLIZATION

Filed Aug. 13, 1964

2 Sheets-Sheet 1

INVENTOR.
J.E. COTTLE

BY *Young & Quigg*

ATTORNEYS

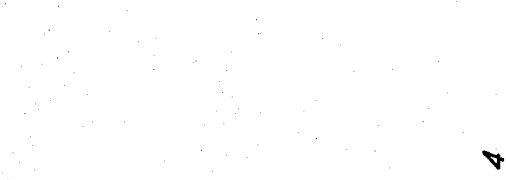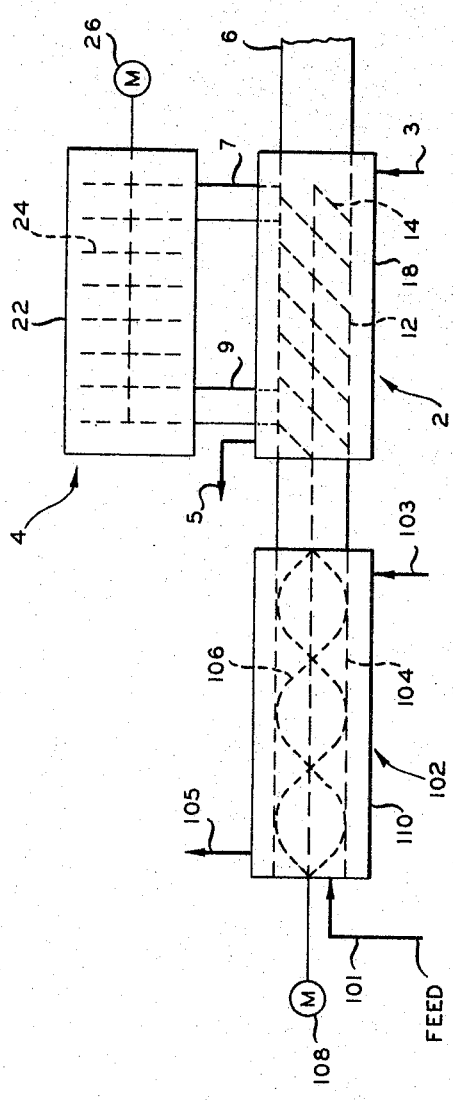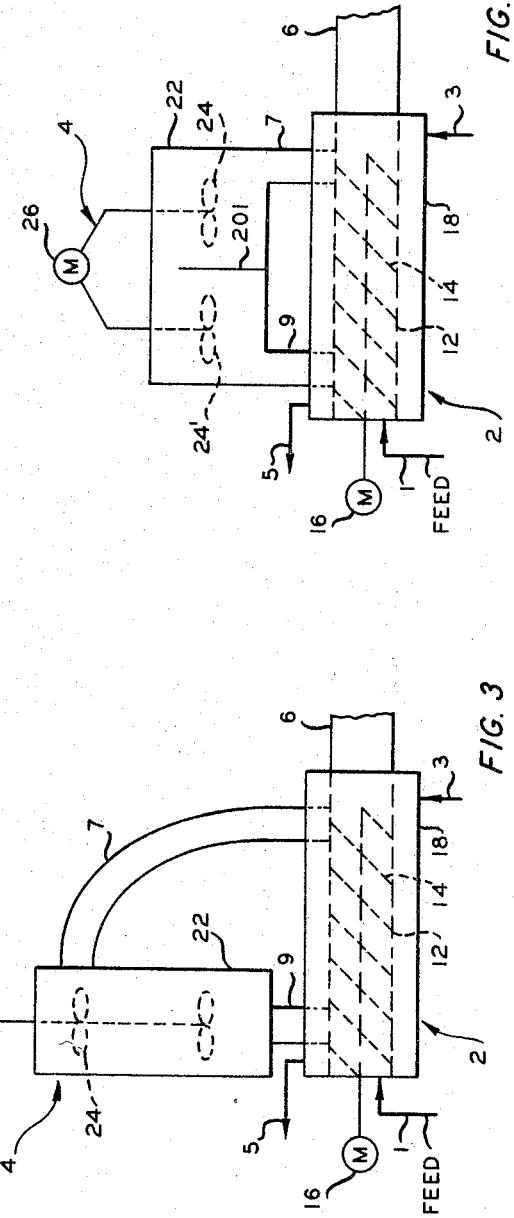

United States Patent Office 3,339,372
Patented Sept. 5, 1967

3,339,372
FRACTIONAL CRYSTALLIZATION
John E. Cottle, Bartlesville, Okla., assignor to Phillips Petroleum Company, a corporation of Delaware
Filed Aug. 13, 1964, Ser. No. 389,374
6 Claims. (Cl. 62—58)

This invention relates to the separation of mixtures by crystallization. In one aspect this invention relates to improved apparatus for forming a crystal slurry. In another aspect this invention relates to improved purification of crystals having spherical-like shape.

Separation by means of fractional crystallization has been known for a number of years. In fractional crystallization separation, an aqueous mixture is subjected to reduced temperatures in a chiller or freezing zone to crystallize one of the components therein and form a slurry thereof. This slurry is then passed through a liquid removal zone where the adhering liquid is removed, a reflux zone and a melting zone. The crystals are melted in the melting zone with a part thereof removed as product and another part forced in a direction counter-current to the movement of crystals in the reflux zone for removing adhering mother liquor therefrom. Various modifications have been made to this process such as scraping the surface of the chiller or freezer to prevent agglomeration of crystals thereon and applying a pulsating pressure to the melt to cause countercurrent intermittent flow of liquid through the crystal bed in the reflux zone for purification of the crystals. These processes are generally applicable to the separation of at least one pure component from any mixture which is resolvable into its components by fractional crystallization. For example, the processes can be used for the concentration of fruit juices, vegetable juices, beer, wine and other materials which comprise aqueous solutions which can be concentrated by the formation and removal of ice crystals. The processes are also of great value in the resolution of non-aqueous mixtures, an example of such an application being the separation of para-xylene from a mixture thereof with the other xylene isomers and ethyl benzene.

In the past, the means employed for forming the crystal slurry has produced generally flat or needle-like crystals of relatively small size. Such crystal structure has often been found to be difficult to purify. I have now found means for forming crystals having spherical-like shape that have very little occluded liquid and adhering liquid. These crystals are substantially impervious to the mother liquor present, are relatively larger in size than the conventional crystals and are easily purified in the reflux zone of known crystal purification columns.

Accordingly, it is an object of my invention to provide for the improved separation of mixtures by fractional crystallization. Another object of my invention is to provide improved apparatus for forming easily purified crystals. Still another object of my invention is to provide for the formation of crystals having a spherical-like shape in a slurry. A further object of my invention is to provide for improved operation of crystal purification means.

Other objects, aspects and advantages of my invention will be apparent to those skilled in the art from a study of this disclosure, the accompanying drawing, and appending claims.

Broadly, this invention permits improved crystallization separation of mixtures obtained by improving the operations of a crystal purification column by providing a feed slurry of crystals having spherical-like shape thereto obtained from a crystallizer comprising, in combination, a freezing zone having a drive auger disposed therein, and a crystal residence zone having agitating means therein and disposed interconnected with the freezing zone to provide a continuous path for the crystal slurry through both zones.

My invention is applicable to the resolution of a vast number of simple binary and complex multicomponent mixture systems by fractional crystallization processes and apparatus. Particularly, such systems are hydrocarbons which have practically the same boiling points and are very difficult to separate by distillation. Where the hydrocarbons are high-boiling organic compounds, separation by crystallization is required because of such compounds being unstable at distillation temperatures. The examples of non-aqueous mixtures include combinations of benzene, normal heptane, carbon tetrachloride, ethyl alcohol, cyclohexane, methyl cyclohexane, toluene, chloroform, acetone, para-xylene, and other xylene isomers, ethyl benzene, and the like. This invention is also applicable to the fractional crystallization separation wherein it is desirable to recover mother liquor from the crystals as a product of the process. This situation arises where it is desired to concentrate a dilute solution. For example, this invention is applicable to the production of concentrated food products which involves primarily the removal of water from these products, such as removing water from fruit juices, such as grape, orange, lemon, pineapple, apple, tomato, and the like, and in the concentration of vegetable juices and other beverages such as milk, beer, wine, coffee, tea, and the like.

My invention will now be described more fully with reference to the accompanying drawings in which FIGURE 1 illustrates a diagrammatic representation of a fractional crystallization system including the features of the invention; FIGURE 2 illustrates diagrammatically another arrangement of the crystal forming apparatus of this invention; FIGURE 3 illustrates diagrammatically still another arrangement of the crystal freezing and residence zones of this invention; and FIGURE 4 illustrates diagrammatically still a further arrangement of the crystal forming apparatus feature of the invention.

Referring now to FIGURE 1 in detail, a feed mixture comprising two or more components, one of which is separable from the rest by crystallization, is passed through conduit 1 into freezing zone 2. Freezing zone 2 comprises housing 12 surrounded by cooling jacket 18 having inlet 3 and outlet 5 for passage of cooling medium therethrough. High speed auger means 14 is positioned within housing 12 and is designed to maintain the surface of housing 12 free of accumulated solids. Auger means 14 is mounted on a rotatable shaft and driven by motor 16 at a speed of about 100 to about 1000 r.p.m. Sufficient cooling medium is circulated through jacket 18 to freeze a predetermined amount of solid crystals of the feed passing therethrough. Generally, the amount of solids desired is between 40 and 50 percent. Crystal residence zone 4 comprising housing 22 is positioned near freezing zone 2 and preferably above same. Agitation means 24, such as propellers, blades, augers, or the like, is positioned within housing 22 and is designed to provide gentle agitation of the crystal slurry to promote growth of the crystals. Agitation means 24 is axially positioned within housing 22 and is driven by motor 26. Auger means 14 acts as a pump to circulate the slurry produced in freezing zone 2 throughout the two zones. The slurry passes from zone 2 through conduit 7 into zone 4 and from there through 9 into zone 2 again, and so forth until the slurry passes into purification zone 6 which comprises an extension of housing 12, filter zone 28 and reflux zone 30. A bed of crystals is maintained in purification zone 6. As the crystal bed is melted by means 32, a portion of the crystal slurry from freezing zone 2 flows into zone 6 and the remainder of the slurry flows through conduit 7 into zone 4. The mother liquor is withdrawn from the crystals in filter zone 28 through conduit 11. In reflux zone 30 near the outlet thereof, heater means 32 is provided for melting the purified crystal mass. The melt product is removed from reflux zone 30 through conduit 13. In reflux zone 30 the crystal mass is countercurrently contacted with liquid reflux. Heating element 32 can be in the form of an electrical heater (as shown) or a heat transfer coil through which a suitably heated fluid is pumped. Electrical power is transmitted to electrical heating element 32 from power source 36 by means of a suitable variable power transformer device, such as variable transformer 34. Part of the melt produced by heater element 32 is forced back into reflux zone 30 to form reflux which effects crystal purification.

Pulsation producing means 8 communicates with the purification column through conduits 13 and 15 to force the reflux countercurrent to the crystal flow in reflux zone 30. Pulsation-producing means 8 comprises a cylinder 44 with a reciprocal piston 46 therein. Piston 46 is suitably sealed in cylinder 44, for example, by means of rings 48, to prevent the leakage of melt from the purification zone. Reciprocation of piston 46 is produced, for example, by electric motor 56, a belt 54, a crank means and connecting rod 52, which is sealed in housing 30 by means of a packing gland. An outlet 17 is provided in housing 44 to facilitate reciprocation of piston 46 and can be connected to means, not shown, for recovery of any material which might escape from the purification column in case of failure of rings 48. The reciprocation of piston 46 can be at any suitable rate, such rate being dependent upon the separation being made in the column and the solids content maintained therein. Generally, pulsations will be produced from reciprocation of piston 46 in the range of about 100 to 500 pulsations per minute. This invention by providing for the continuous circulation of the crystal slurry in the freezing zone and residence zone allows for the crystals to grow in size and obtain spherical-like shapes which are easily purified in the purification column because only small amounts of mother liquor are occluded thereto.

While the invention has been illustrated utilizing an indirect heating-exchange freezing zone, it is within the contemplation of the invention to utilize direct heat exchange between a suitable refrigerant, such as propane, and the feed. Also an external heater can be employed in place of the internal heating element 32 within the melt section of reflux zone 30 of the purification column.

In FIGURE 2, the freezing zone 2 and residence zone 4 have the same arrangement as described in FIGURE 1. This arrangement has the additional initial freezing means 102 feeding the above-described freezing zone 2. Freezing zone 102 is a conventional scraped surface chiller comprising housing 104 having disposed therein a low speed surface scraping auger 106 powered by motor 108 and surrounded by cooling jacket 110 having inlet 103 and outlet 105 for passing cooling medium therethrough. Feed to freezing zone 102 enters through conduit 101. The crystal slurry leaves the described freezing zone through zone 6 in a manner as described in FIGURE 1. In this arrangement, both auger means 14 and scraping auger 106 can be driven by the same motor 108, as shown, but will be geared and connected through concentric drive mechanisms so as to provide different speeds to each auger. Each auger can be driven by separate motor means.

In FIGURE 3, like numerals have been used for like items as shown in FIGURE 1, and the residence zone 4 is disposed in vertical elongation above freezing zone 2. The remainder of the features are similar to that in FIGURE 1 except that conduit 7 is extended in length to reach from the end of freezing zone 2 to the top portion of residence zone 4. The slurry from this crystal-forming zone arrangement flows through zone 6 to the purification column as described in FIGURE 1.

In FIGURE 4, an arrangement similar to that in FIGURE 1 of the crystal-forming zone is shown and like reference numerals have been employed for like items. This figure shows the additional feature of a baffle 201 dividing the residence zone 4 and thus insuring further travel of the crystals through the residence zone. Agitating means 24 and 24' are shown in each compartment of the residence zone 4. The slurry of crystals from this forming zone arrangement flows through zone 6 to the purification column as described in FIGURE 1.

In operation of the arrangement shown in FIGURE 2, in the conventional scraped surface chiller 102, the feed will be frozen to produce approximately a slurry containing 20 percent solids. This slurry is then fed to freezing zone 2 and residence zone 4 wherein the solids content is increased to 50 percent of the slurry before passing to the purification column.

The improved operation of the purification column provided by this invention is apparently two-fold, one being that the feed material is frozen in a crystal forming zone which produces crystals having spherical-like shape with only a small amount of occluded mother liquor, thus providing easier separation and removal of mother liquor from the crystals. Also, with the use of an auger drive means 14 in freezing zone 2, the feed is frozen to a greater percentage of solid material and thus a greater percentage of solids is fed to the purification column. This increased solids content of the slurry aids in the removal of the mother liquor therefrom as it increases the quantity of the desired component formed as crystals and reduces the quantity of that component remaining with the mother liquor which results in greater purity products.

*Example*

The fractional crystallization system utilized in this example is of the type illustrated in FIGURE 1. Freezing zone housing 12 is a cylindrical vessel 1 foot in diameter and 9 feet long. Auger 14 has a 1 to 1 pitch and rotates at 300 r.p.m. Residence zone 4 is a cylindrical vessel 22 inches in diameter and 9 feet long. The temperature in zone 4 is maintained at 25° F. Refrigerant is passed through jacket 18 and freezing zone 2 at 10° F. One-hundred and seventy gallons per hour of 3.2 weight percent beer is passed through conduit 1 into freezing zone 2. Purification zone 6 inlet is maintained at 25° F. Ninety gallons per hour of beer concentrate containing 6.0 weight percent alcohol is removed through conduit 11 as mother liquor. Eighty gallons per hour of water product is removed through conduit 13. The crystal-like spheroids fed from freezing zone 2 to purification zone 6 have a diameter size from 0.4 to 2 millimeters.

The combination freezing zone and residence zone of this invention allows a greater pressure drop to be maintained across the surface of freezing zone 2 than is capable with similar size conventional freezing units.

Variations and modifications within the scope of the disclosure and of the appended claims can readily be effected by those skilled in the art without departing from the spirit and scope of this invention.

That which is claimed is:

1. Fractional crystallization apparatus comprising, in combination, a first elongated cylindrical chamber having inlet and outlet means, a heat-exchange jacket having inlet and outlet means surrounding said first chamber, auger-scraper means axially disposed in said first chamber and adapted to pump material therethrough and scrape the inner wall thereof, a second elongated cylindrical chamber having a vertical baffle disposed therein dividing said chamber into two zones communicating across said baffle at the top of said cylinder, plural agitators within said second cylindrical chamber, one being positioned on each side of the baffle, said first and second chambers connected by first and second conduits adapted to provide a circular path therethrough, a third elongated cylindrical chamber communicating with the outlet of said first chamber, stationary filtration means positioned in said third chamber with means for withdrawing liquid therefrom, and melting zone means associated with said third chamber with means for withdrawing melt therefrom.

2. The apparatus of claim 1 further comprising pulsation means associated with said melt zone means.

3. A continuous process of separating a material by fractional crystallization comprising feeding said material to a crystallization zone having a heat exchange surface refrigerated with a jacketed refrigerant to form crystals of at least one component of said feed, scraping formed crystals from the heat exchange surface with an auger rotating at a speed of about 100 to 1000 r.p.m. to provide a slurry of crystals in mother liquor, continuously withdrawing a portion of the slurry at the downstream portion of said heat exchange surface prior to feeding into a purification zone and introducing said portion to a separate adjacent residence zone, gently mechanically agitating by means of a moving member the said portion in said residence zone to further promote crystal growth, and continuously returning said portion directly to the upstream portion of said heat exchange surface, feeding said slurry to a purification separation zone, removing non-crystallized feed components from said crystals through a filter within said purification zone, heating said crystals in said purification zone to melt same, and removing purified product therefrom.

4. A continuous process for separating a material by fractional crystallization comprising feeding said material to a crystallization zone having a heat exchange surface refrigerated by a jacketed refrigerant to form crystals of at least one component of said feed; removing formed crystals and residual liquid from the crystallization zone with an auger rotating at a speed of about 100 to 1000 r.p.m. to provide a slurry of crystals in mother liquor; continuously feeding a portion of said slurry to a purification separation zone, removing non-crystallized feed components from said crystals through a filter within said purification zone; heating the remaining crystals in said purification zone to melt same; removing purified product therefrom, continuously withdrawing a second portion of the slurry at the downstream portion of heat exchange surface and introducing said second portion to a separate adjacent residence zone; gently mechanically agitating with a moving member the said second portion in said residence zone to further promote crystal growth; and continuously returning said second portion to the upstream portion of said heat exchange surface.

5. A continuous process for separating a material by fractional crystallization comprising gently mechanically agitating with a moving member said material in an agitating zone; flowing material from said agitating zone into the inlet of a separate adjacent crystallization zone having a heat exchange surface and having an auger positioned therein to pump material through said crystallization zone; rotating said auger at a speed of about 100 to 1000 r.p.m.; passing said material through said crystallization so as to form crystals of at least one component but not all of the material; passing the material containing the crystals from the outlet of the crystallization zone into the agitating zone; continuously circulating the material containing the crystals through the agitating zone and crystallization zone until the entire body of material is converted into a slurry of substantially spherical crystals in mother liquor; continuously feeding a portion of the slurry from the outlet of the chilling zone to a purification separation zone; removing mother liquor from said crystals through a filter means in said purification zone; heating said crystals in said purification zone to melt same; and removing purified product from said purification zone.

6. Fractional crystallization apparatus comprising, in combination, an agitating tank mechanical; agitator means in said agitator tank; power driving means for said agitator means; a cylindrical crystallization chamber; a first flow conduit connecting a first lower portion of said agitating tank to a first end of said crystallization chamber; a second flow conduit connecting a second lower portion of said agitating tank to a second end of said crystallization chamber; refrigerating means jacketing said crystallization chamber; an auger in said crystallization chamber extending substantially the length of same between said two conduits; means to supply liquid to the first end of said crystallization chamber; means to rotate said auger at a speed of about 100 to 1000 r.p.m. to pump a slurry of liquid and crystals therethrough from the first conduit connection to the second; a discharge outlet for said slurry separate from said flow conduits adapted to remove a portion of slurry from said chilling chamber; an elongated cylindrical purification chamber having an inlet in a first end in communication with the outlet of said crystallization chamber and an outlet at a second end; a stationary filtration means positioned in said purification chamber; means for withdrawing liquid from said filtration means; and crystal melting means positioned in said purification chamber between said filtration means and said outlet at said second end.

References Cited
UNITED STATES PATENTS

| | | | |
|---|---|---|---|
| 2,672,487 | 3/1954 | Tegge et al. | 62—58 |
| 2,735,843 | 2/1956 | Weedman | 62—124 |
| 2,895,835 | 7/1959 | Findlay | 62—58 |
| 2,896,419 | 7/1959 | Thompson | 62—58 |
| 2,940,272 | 6/1960 | Croley | 62—58 |
| 2,997,856 | 8/1961 | Pike | 62—58 |
| 3,177,673 | 4/1965 | Svanoe | 62—58 |
| 3,182,463 | 5/1965 | Stearns | 62—58 |
| 3,193,395 | 7/1965 | Tabler et al. | 62—58 |
| 3,222,880 | 12/1965 | Findlay | 62—58 |

NORMAN YUDKOFF, *Primary Examiner.*

G. P. HINES, *Assistant Examiner.*